United States Patent [19]

Schwartzman

[11] 4,192,217
[45] Mar. 11, 1980

[54] SELF-DRILLING SCREW

[75] Inventor: Irwin J. Schwartzman, Northridge, Calif.

[73] Assignee: J. Schwartzman Manufacturing & Supply Co., North Hollywood, Calif.

[21] Appl. No.: 925,345

[22] Filed: Jul. 17, 1978

[51] Int. Cl.² .......................................... F16B 25/00
[52] U.S. Cl. ......................................... 85/41; 408/228
[58] Field of Search ............................ 85/41, 47, 1 P; 408/228, 227, 229, 230, 226; 10/10 R

[56] References Cited

U.S. PATENT DOCUMENTS

| 2,401,307 | 6/1946 | Manewich | 408/229 |
| 2,889,725 | 6/1959 | Turton et al. | 408/228 |
| 3,085,453 | 4/1963 | Mossberg | 408/226 X |
| 3,395,603 | 8/1968 | Skierski | 85/47 |
| 4,125,050 | 11/1978 | Schwartzman et al. | 85/41 |

Primary Examiner—Ramon S. Britts
Attorney, Agent, or Firm—Whann & McManigal

[57] ABSTRACT

A self-drilling screw having an elongated threaded shank with a driving head at one end and a drilling body portion at its other end formed with longitudinally extending flutes located substantially on opposite sides of the body, these flutes defining rectilinear tip and side cutting edges positioned along opposite sides of the body, the tip-cutting edges being forwardly offset and angularly diverging from the ends of a transverse cutting edge, formed on a tip web, to diametral opposite points on the body providing a transverse width at least equal to the root diameter of the threads on the shank, and at which points the tip-cutting edges connect with the side-cutting edges which are angularly inclined towards their outer ends in a rearward direction circumferentially of the body. Narrow inwardly inclined relief planar surfaces parallel the respective cutting edges, and are augmented by a plurality of additional contiguous back relief planar surfaces of greater angular inclination than the relief surfaces extending immediately along the cutting edges. One of the walls of each flute adjacent each end of the transverse cutting edge of the tip web is notched to provide salient cutting edge portions at the ends of the tip web, these salient cutting edges being so conformed as to effect a clawing cutting action.

4 Claims, 4 Drawing Figures

U.S. Patent    Mar. 11, 1980    4,192,217
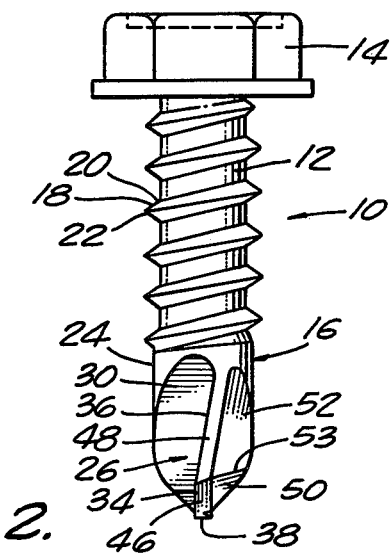
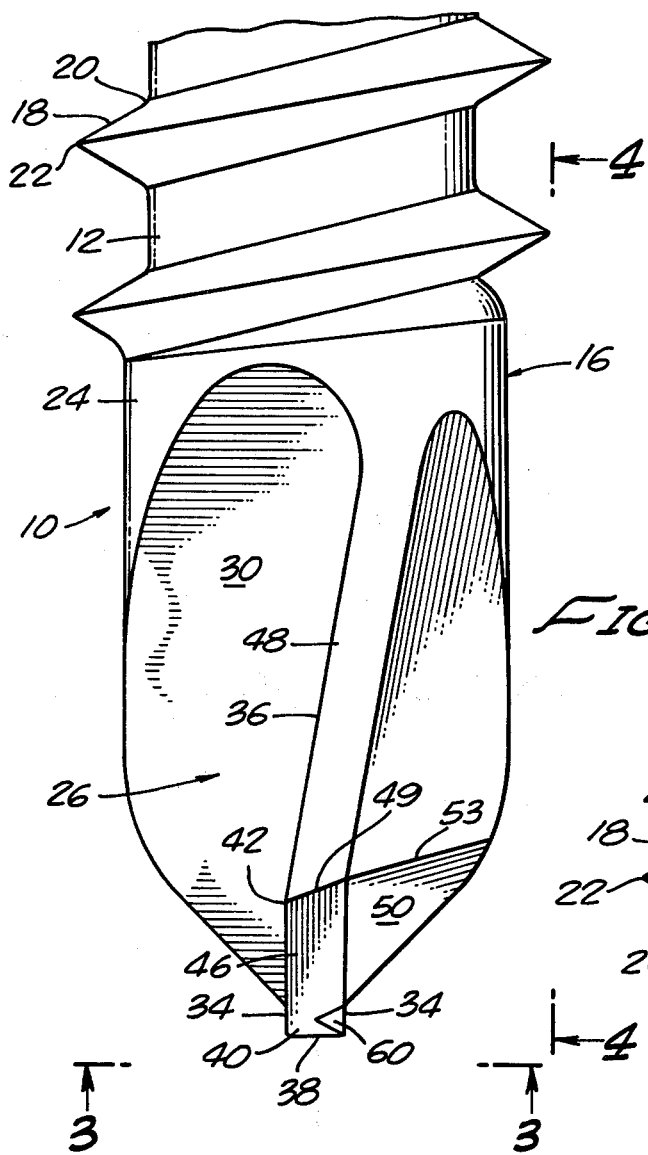
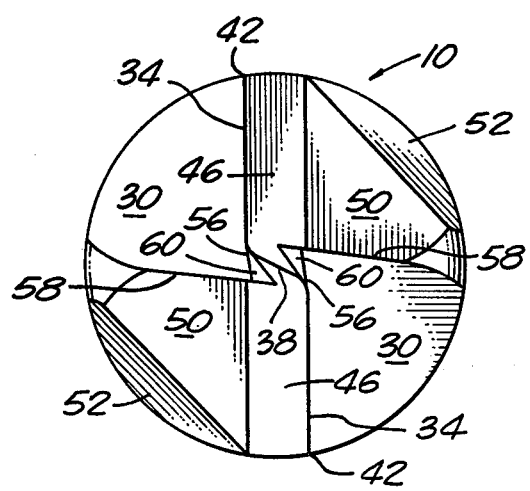
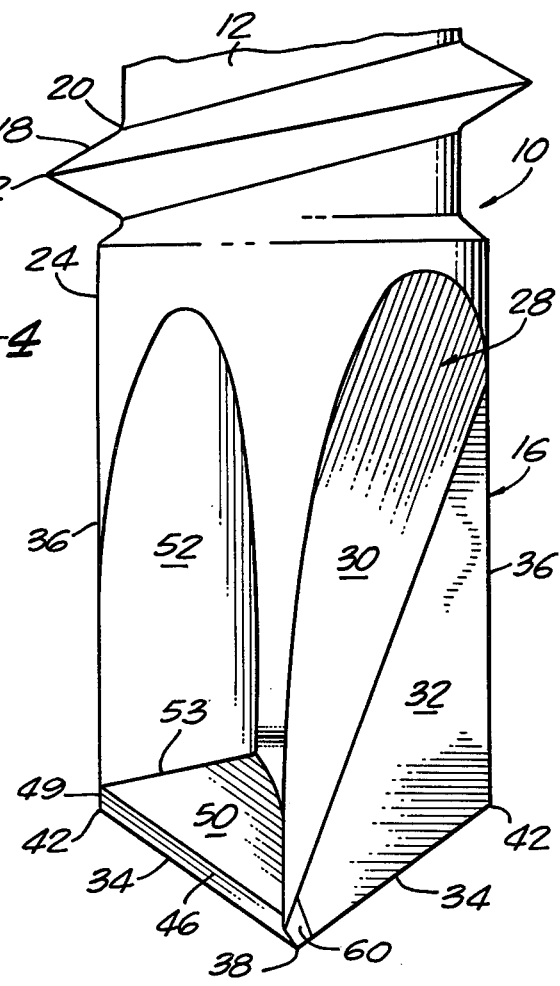

SELF-DRILLING SCREW

PRIOR ART

In the prior art there are numerous screw structures which are formed with a drilling end portion to provide a self-drilling screw embodiment. The closest art known to applicant are the following patents:

| U.S. Pats. | |
| --- | --- |
| 3,125,923 | March 24, 1964 |
| 3,318,182 | May 9, 1967 |
| 3,241,426 | March 22, 1966 |
| 3,463,045 | August 26, 1969 |
| 3,710,676 | January 16, 1973 |
| 3,747,143 | July 24, 1973 |
| 3,079,831 | March 5, 1963 |
| 3,782,056 | January 1, 1974 |
| 3,786,713 | January 22, 1974 |
| 3,812,639 | May 28, 1974 |
| 3,882,756 | May 13, 1975 |
| 3,933,075 | January 20, 1976 |

| Foreign Patents | | |
| --- | --- | --- |
| 690,269 | Gr. Britain | April, 1953 |
| 976,849 | Gr. Britain | December, 1964 |
| 639,198 | Italy | May, 1962 |

BACKGROUND OF THE INVENTION

The present invention relates generally to the field of threaded fasteners.

A study of the prior art patents reveals that a formidable amount of time and attention has been directed to the improvements of such design features, for example, as would facilitate forging operations during fabrications, the use of elements to break up the drilling chips, as well as others, which would and have undoubtedly contributed to the advancement of the art as it relates to the field of self-drilling screws.

I have discovered, however, that the prior developments have noticeably overlooked or neglected to consider the deleterious effects of drag or friction inherent in the conventional self-drilling screws.

In the present invention, I have therefore provided a unique arrangement of the cutting edges in relation to angularly extending associated relief surfaces such that the friction drag, heating, work-hardening and other inherent undesirable characteristics of the conventionally available self-drilling screws will be materially reduced, and that as a result the self-drilling screws constructed in accordance with the features of my present invention will have improved operating characteristics.

SUMMARY OF THE INVENTION

The present invention is more specifically concerned with improvements in the drilling end of threaded fasteners of the self-drilling screw type and comprises improvements in the self-drilling screw disclosed in Schwartzman, et al. application Ser. No. 803,801, filed June 6, 1977.

One object of the herein described invention is to provide a self-drilling screw having improved and more efficient operating characteristics.

A further object resides in the provision of a self-drilling screw in which the tip and side-cutting edges of the drilling portion of the screw are rectilinear and are provided with a plurality of unique angularly extending planar relief surfaces which permit the flow of removed material away from the cutting edges.

A further object is to provide a self-drilling screw in which the cutting edges and associated angularly positioned relief surface areas are so arranged as to reduce the frictional drag and the concomitant development of heat, to the end that the probability of work hardening of the drilled material will be advantageously reduced, and the cutting edges will retain their sharpness and effectiveness.

Another object is to provide a drilling screw having a drilling end portion in which the converging tip-cutting edges are associated with a transverse cutting edge of a tip web in a manner such that the friction and drag on the entire drilling point will be substantially reduced, and in which the screw will stabilize quickly and have little or no tendency to walk during the starting of the drilling operation.

Yet another object is to provide a self-drilling screw with tip-cutting edges that extend outwardly respectively from the opposite ends of a tip web, and wherein salient cutting edge portions are formed at the ends of the tip web with a configuration such that they will have in effect a clawing cutting action with respect to the engaged surface that is being drilled.

Yet still another object resides in a self-drilling screw in which salient cutting edge portions are formed at the ends of a tip web, the cutting edges being formed by means of notches in associated flute surface forming portions.

Still another object is to provide a self-drilling screw in which the cutting edges and associated angular relief surfaces are relatively so positioned that the use of forging operations, during fabrication, will result in the production of stronger, harder and sharper cutting edges.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only, FIG. 1 is a side elevational view showing a self-drilling screw incorporating features of the present invention;

FIG. 2 is an enlarged fragmentary elevational view similar to FIG. 1, showing details of the drilling end portion thereof;

FIG. 3 is an end view of the screw as shown in FIG. 2, and as seen from line 3—3 of FIG. 2; and FIG. 4 is an enlarged fragmentary elevational view of the drilling end portion as seen from line 4—4 of FIG. 2.

DESCRIPTION OF A PREFERRED EMBODIMENT

Referring more specifically to the drawings, for illustrative purposes, the self-drilling screw, as generally indicated by the numeral 10, embodies an elongated shank portion 12 which is formed at one end with an appropriate driving head 14, and at its other end with a drilling portion 16.

The shank portion 12 is fabricated to provide helical thread convolutions 18 thereon, these convolutions preferably extending from adjacent the driving head to the drilling portion 16, and being formed to provide a root diameter 20 which is substantially coincident with the outer surface of the shank portion 12, and a crest diameter 22.

The drilling portion 16 is formed preferably by a forging operation to provide a generally cylindrical body 24 which preferably has a maximum diameter which is slightly greater than the root diameter of the threads 18.

The body 24 is formed with longitudinally extending flutes 26 and 28, as best shown in FIG. 3, which are located substantially on opposite sides of the body 24. Each flute comprises an elongate recess in the body 24, which is defined by angularly joined substantially planar wall surfaces 30 and 32 in substantially right-angled relation, the surface 32 in each case being outwardly terminated and defining a rectilinear tip-cutting edge 34 and rectilinear side-cutting edge 36.

As best shown in FIG. 3, the tip-cutting edges 34, 34 are forwardly offset with respect to the longitudinal axis of the drilling portion and lie in substantially parallel planes. At their inner ends, the tip-cutting edges extend outwardly in diverging directions from the ends of a transversely extending point-cutting edge 38 formed on an interconnecting tip web portion 40. The tip-cutting edges 34 extend outwardly to diametrically opposite outer points 42 on the body 24 which provide a maximum transverse cutting width at least equal to the root diameter of the threads 18 of the screw shank. At these points, each of the tip-cutting edges connects with the inner end of a side-cutting edge 36. Each of the side-cutting edges 36, as shown in FIG. 2, has a rake angle in a rearward direction circumferentially of the body 24.

An important feature of the present invention resides in the provision of a plurality of relief surfaces which extend behind the tip and side-cutting edges, these relief surfaces having planar configuration, and serving to provide space for the free movement of displaced drilled material around the entire drilling tip during a drilling operation preparatory to the threads of the screw engaging the material. As a consequence of this unique feature, friction and drag are materially decreased so that there is less possibility of causing work hardening which would tend to dull the cutting edges and undesirably resist the drilling operation by the screw. A further advantage of the screw structure is that the screw will stabilize quickly and there will be little or no tendency of the screw to walk at the beginning of the drilling operation.

More specifically, these relief surfaces include relatively narrow contiguous flat surfaces 46 and 48 which extend along and substantially parallel the tip-cutting edge 34 and side-cutting edge 36. These relief surfaces are joined along a common edge 49, which extends rearwardly from each of the outer points 42, and are inclined from the associated cutting edges at an angle of substantially 18°. As arranged, the surfaces 46 and 48 provide immediate relief for the material as it is removed by the cutting edges. The cutting edges are additionally relieved in the tip and side areas by additional relief areas which are formed by a back relief angularly inclined flat surface 50 in the tip area, and an elongate angularly inclined flat relief surface 52 in the side area, these relief areas being joined along a common edge 53 which connects with the edge 49 and extends rearwardly therefrom.

The relationship between each flute sidewall 32, the surfaces 46 and 48, and the relief surfaces 50 and 52, has been found to be of advantage in connection with the forging operation for the formation of the cutting edges 34 and 36. The wall 32 and surfaces 50 and 52 may be formed by die surfaces which coact to apply restraining side pressures while the die-forming surfaces for forming the surfaces 46 and 48 are applying pressure during the formation of cutting edges 34 and 36. With this constraining of forces, the material along the cutting edges will be hardened during the forging operation, and sharper and longer wearing cutting edges will be obtained.

A self-drilling screw according to the present invention provides a unique drilling tip that will drill faster without producing excess heat, and will reduce the tendency of the drill tip to walk. The tip-cutting edges will gradually increase the drilled opening and as the drilled material increases, the arrangement of the angular relief surfaces provides greater flow space for the removed material as the drilling progresses. This has been found to be a tremendous advantage over the conventional arrangements in which only a single relief angled surface is provided. The reduction of friction and drag prevents work hardening in the case of certain metals and thus enables the cutting edges to more effectively resist dulling during the drilling operation. The side-cutting edges and the rake angle defined by the flute wall 32 have been found to advantageously contribute to the finishing of the drilled hole and the drilling action with respect to the drawing of the drilling tip into the material being drilled.

Another important feature of the present structure resides in the improved configuration of the tip web and the point-cutting edge 38 so as to provide more effective salient edge portions 56, 56 at the opposite ends of the point-cutting edge 38 where it joins the tip-cutting edges 34. As shown in FIG. 3, the orientation of the oppositely disposed flute surfaces 30, 30 is arranged so that their tip terminating edges 58 are in offset relation adjacent the longitudinal axis of the drilling portion.

In order to provide the salient cutting edge portions 56 at the opposite ends of the point-cutting edge 38, and which are shaped so that they will have in effect a clawing cutting action adjacent the longitudinal drilling axis with respect to the engaged surface that is being drilled, the adjacent marginal face portions of the flute surfaces 32 are respectively angularly cut out or notched as indicated at 60, the notch being of tapered configuration in a direction away from the point-cutting edge 38. It will also be seen that one wall of the notch 60 is common to and in the plane of the flute wall surface 30, while the other wall of the notch is in angular relation to the flute wall surface 32.

From the foregoing description and drawings, it is believed that it will be clearly evident that the delineated objects and features of the invention will be accomplished.

Various modifications may suggest themselves to those skilled in the art without departing from the spirit of my invention, and, hence, I do not wish to be restricted to the specific form or forms shown or uses mentioned, except to the extent indicated in the appended claims.

I claim:

1. In a self-drilling screw having an elongated threaded shank with a driving head at its outer end and a drilling portion at its inner end, the improvement in which:
   (a) the drilling portion comprises a body having longitudinally extending flutes located substantially on opposite sides of said body;
   (b) a pair of back relief surface areas extending along and being further inclined with reference to the relief surfaces paralleling each of said tip-cutting edges and said side-cutting edges, said back relief surface areas having contiguous surface areas joined along a common edge extending rearwardly from the joined ends of the relief surfaces; and
   (c) means forming salient cutting edges at the opposite ends of the cutting edge formed on said tip web, said salient cutting edges being conformed to provide a clawing cutting action in each case.

2. A self-drilling screw according to claim 1, in which:
   said flutes are respectively bounded by planar wall surfaces in substantially right-angled relation, one of said wall surfaces of the flutes having outer marginal portions terminating to form said tip and side-cutting edges and the other of said wall surfaces of the flutes have tip terminating edges in offset relation adjacent the longitudinal axis of the drilling portion; and
   said salient cutting edges are defined in each case by a marginal notch at the tip end of said one of said flute wall surfaces.

3. A self-drilling screw according to claim 2, in which:
   said notch is of tapered configuration in a direction away from said the cutting edge formed on said tip web.

4. A self-drilling screw according to claim 2, in which:
   the notch has one surface common to said other wall surface of said flute, and another surface in angular relation to said one surface of said flute.

* * * * *

UNITED STATES PATENT OFFICE
CERTIFICATE OF CORRECTION

Patent No. 4,192,217　　　　　　　　Dated March 11, 1980

Inventor(s) IRWIN J. SCHWARTZMAN

It is certified that error appears in the above-identified patent and that said Letters Patent are hereby corrected as shown below:

Column 5, following line 7, insert the following:

--(b)　said flutes defining rectilinear tip and side-cutting edges positioned generally on opposite sides of said body, and tip-cutting edges having forwardly offset tip end cutting edges angularly diverging from the ends of a transverse cutting edge formed on a tip web, to diametral opposite points on said body providing a transverse width at least equal to the root diameter of the threads on said shank; the side-cutting edges extending from the outer ends of the tip-cutting edges to points generally adjacent the inner end of the shank threads, and the side-cutting edges each being angularly inclined from its connection with the tip-cutting edge, in a rearward direction circumferentially of said body;

(c)　relief surfaces including a relatively narrow contiguous flat surface extending along and substantially paralleling each tip-cutting edge and

UNITED STATES PATENT OFFICE
CERTIFICATE OF CORRECTION

Patent No. 4,192,217      Dated March 11, 1980

Inventor(s) IRWIN J. SCHWARTZMAN

It is certified that error appears in the above-identified patent and that said Letters Patent are hereby corrected as shown below:

> each side-cutting edge, the relief surfaces being joined adjacent the diametral opposite points, and each of said relief surfaces being angularly inclined from its associated cutting edge and forming an immediate relief therefor; --;
>
> line 8, delete "(b)" and insert --(d)--;
>
> line 16, delete "(c)" and insert --(e)--.

Signed and Sealed this

Third Day of November 1981

[SEAL]

Attest:

GERALD J. MOSSINGHOFF

Attesting Officer     Commissioner of Patents and Trademarks